(12) United States Patent
Yamanaka et al.

(10) Patent No.: US 6,723,441 B1
(45) Date of Patent: Apr. 20, 2004

(54) RESIN FILM LAMINATED METAL SHEET FOR CAN AND METHOD FOR FABRICATING THE SAME

(75) Inventors: Yoichiro Yamanaka, Fukuyama (JP); Hiroki Iwasa, Fukuyama (JP); Hiroshi Kubo, Fukuyama (JP); Shinsuke Watanabe, Fukuyama (JP); Yoshinori Yomura, Kawasaki (JP)

(73) Assignee: NKK Corporation, Tokyo (JP)

( * ) Notice: Subject to any disclaimer, the term of this patent is extended or adjusted under 35 U.S.C. 154(b) by 1 day.

(21) Appl. No.: 09/665,323

(22) Filed: Sep. 19, 2000

(30) Foreign Application Priority Data

| Sep. 22, 1999 | (JP) | 11-268989 |
| Mar. 16, 2000 | (JP) | 2000-074316 |
| Aug. 7, 2000 | (JP) | 2000-238166 |

(51) Int. Cl.$^7$ .......................... B32B 7/02; B32B 27/06; B32B 27/08; B32B 27/32; B32B 27/36
(52) U.S. Cl. .......................... 428/457; 428/458; 428/461; 428/480; 428/484; 428/500; 428/688
(58) Field of Search .................. 428/457, 458, 428/484, 480, 461, 500, 688

(56) References Cited

U.S. PATENT DOCUMENTS

| 4,777,094 A | * | 10/1988 | Mauri et al. ................ 428/463 |
| 4,861,647 A | | 8/1989 | Ishikawa et al. |
| 5,487,950 A | * | 1/1996 | Weber et al. ................ 428/484 |
| 5,705,240 A | * | 1/1998 | Machii et al. ............. 428/35.9 |

FOREIGN PATENT DOCUMENTS

| EP | 0 312 309 | | 4/1989 |
| EP | 0 664 209 | A | 7/1995 |
| EP | 0 875 298 A1 | A | 11/1998 |
| EP | 0 928 684 | A | 7/1999 |
| GB | 1 471 397 | A | 4/1977 |
| GB | 2 289 864 | A | 12/1995 |
| JP | 63-236640 | A | 10/1988 |
| JP | 5-200961 | A | 8/1993 |

* cited by examiner

*Primary Examiner*—Paul Thibodeau
*Assistant Examiner*—Nikolas J Uhlir
(74) *Attorney, Agent, or Firm*—Frishauf, Holtz, Goodman & Chick, P.C.

(57) ABSTRACT

The present invention relates to a resin film laminated metal sheet for can, in which both faces of the metal sheet have resin film laminated layers, and a surface free energy $\gamma s$ of a face of the resin film is 10 dyn/cm or more to less than 30 dyn/cm, the face becoming an inside of can after can-making and being contacted with stuffed food contents. As the resin film, applicable is a polypropylene film or a propylene ethylene based random copolymer film of polypropylene being a main component. Further, a resin film of polyester being a main component and containing a wax component of 0.1 to 2.0% is used in a resin film to be an inside of can after can-making. The resin film laminated metal sheet for can according to the invention has excellent formability and adhesion while can-making and superior taking-out property of stuffed food contents.

15 Claims, 3 Drawing Sheets

RESIN FILM LAMINATED METAL SHEET FOR CAN AND METHOD FOR FABRICATING THE SAME

BACKGROUND OF THE INVENTION

1. Field of the Invention

The present invention relates to a resin film laminated metal sheet to be mainly used to drums and caps of food stuffed cans, in particular a resin film laminated metal sheet for can, which has excellent formability and adhesion while can-making and superior taking-out property of stuffed food contents, and to a method for fabricating the same.

2. Description of Related Art

Conventionally, coatings have been carried out on metal sheets such as tin free steel (TFS) or aluminum as blank materials for can to be used to food stuffed cans. The coating technique was involved with many problems of being complicated in a baking procedure, taking much treating time, or exhausting much solvent. Therefore, instead of coating, a lot of methods have been proposed for laminating a thermoplastic resin film to heated metal sheets.

The object of these methods is to improve formability and adhesion of resin film laminated metal sheets, mainly ① by applying a resin film having a polar group such as a polyester resin (for example Japanese Patent Laid Open No. 63-236640) or ② by carrying out a treatment such as corona discharge on a surface of resin film so as to increase a surface free energy γs of resin film (for example, Japanese Patent Laid Open No. 5-200961). In particular, Japanese Patent Laid Open No. 5-200961 discloses that the γs of resin film should be specified in a range of 38 to 54 dyn/cm for securing adhesion after forming polyethylene film laminated metal sheets.

On the other hand, there is a problem that if such a resin film laminated metal sheet is applied to food stuffed cans, when removing fully stuffed food contents from the can, it is difficult to take out them because they are firmly stuck to an inside of the can. This problem weakens consumers' purchasing desires, and a resolution of the problem is seriously important, however up to now no investigation has been ever performed.

SUMMARY OF THE INVENTION

It is accordingly an object of the invention to provide a resin film laminated metal sheet for can, which is excellent in formability and adhesion while can-making and in taking-out property of stuffed food contents, and a method for fabricating the same.

This object can be accomplished by such a resin film laminated metal sheet for can, in which both faces of the metal sheet have resin film laminated layers, and a surface free energy γs of a face of the resin film is 10 dyn/cm or more to less than 30 dyn/cm, the face becoming an inside of can after can-making and being contacted with stuffed food contents.

As the resin film, available is, for example, a polypropylene film or a propylene ethylene based random copolymer film of polypropylene being a main component.

It is more effective to use a resin film of polyester being a main component and contain a wax component of 0.1 to 2.0% in the resin film which will be an inside of can after can-making.

The resin film laminated metal sheet for can having such a resin film may be fabricated by a method comprising a step of laminating a resin film composed of a polypropylene film or a propylene ethylene based random copolymer film of polypropylene being a main component on the surface of the metal sheet which will become an inside of can after can-making, wherein the temperature of the metal sheet is above the melting point of the resin film after passing laminating rolls; otherwise by another method comprising a step of laminating a resin film of polyester being a main component on the surface of the metal sheet, wherein the temperature of the face of the resin film to be adhered to the metal sheet is above the melting point of the resin film between 1 and 20 msec.

DETAILED DESCRIPTION OF THE INVENTION

Figure 1A:
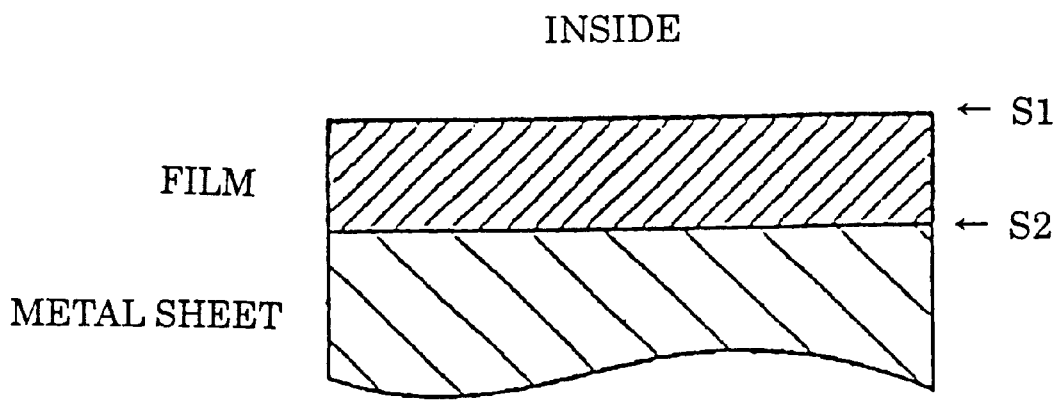
FIGS. 1A and 1B are cross sectional views of the resin film laminated metal sheet of the invention.

We earnestly studied the relation between the resin film and the taking-out property of stuffed food contents in a resin film laminated metal sheet for can, and consequently found that the taking-out property has a close relation with a surface free energy γs of the resin film, and if the γs is more than 30 dyn/cm, the sticking between the resin film and the stuffed contents is excessive so that the taking-out property of stuffed food contents is poor. Accordingly, if the resin film of γs being less than 30 dyn/cm, more preferably less than 22 dyn/cm is, as seen in FIG. 1A, laminated on a face of the metal sheet which will be an inside of can after can-making, the γs of the face S1 contacting stuffed food contents can be less than 30 dyn/cm, whereby it is possible to provide a resin film laminated metal sheet for can excellent in taking-out property of stuffed food contents.

As mentioned above, since an ordinary resin film to be used to a resin film laminated metal sheet receives a surface activation treatment such as corona discharge, its γs is more than 30 dyn/cm. For setting γs to be less than 30 dyn/cm, it is necessary to select an appropriate resin film, and to omit the surface activation treatment such as corona discharge. This omission does not cause any problem in the fabrication of the resin film, but is advantageous in production cost.

As far as the γs is less than 10 dyn/cm, the taking-out property is almost saturated, and since the fabrication of the resin film having such a γs is difficult, it should be 10 dyn/cm or more.

Even if using the resin film of γs of not less than 10 dyn/cm to less than 30 dyn/cm, the formability and the adhesion are not spoiled while can-making.

Figure 1B:
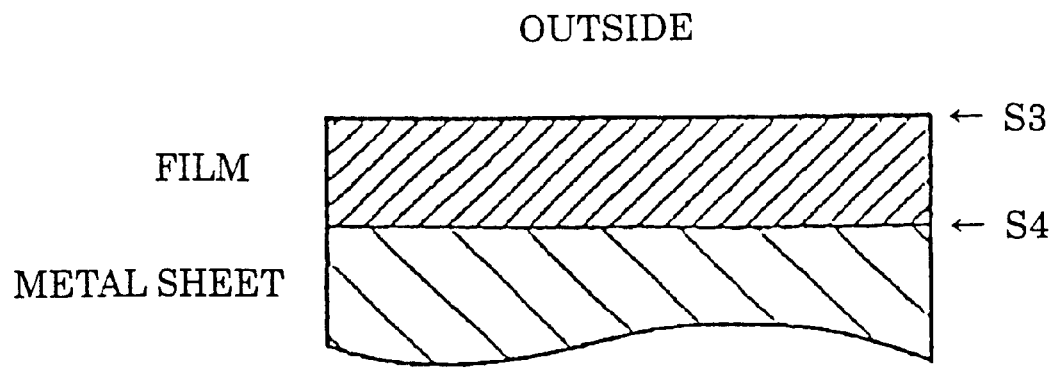

Ordinarily, to the outside face S3 of can shown in FIG. 1B, since trade names or trade marks are printed, a wettability to ink should be improved, and therefore, the γs of the face of the resin film contacting an atmospheric air should be preferably determined to be 25 dyn/cm or higher.

It is preferable that the γs of the faces S2 and S4 of the resin film shown in FIGS. 1A and 1B to be adhered to the metal sheet is smaller than the γs of the metal sheet so as to further improve the adhesion.

As the resin film of γs being 10 to less than 30 dyn/cm, available is a polypropylene film or a propylene ethylene based random copolymer film of polypropylene being a main component. Since these resin films have a molecular structure containing no polar group, the γs is low, and having good elongation and strength, they are advantageous for formability while can-making.

Further, if using, to the face S2 contacting the metal sheet shown in FIG. 1A, for example, a resin film having an adherent layer comprising a polar group composed of a polypropylene film modified with maleic acid anhydride or a propylene ethylene based random copolymer film modified with maleic acid anhydride, the adhesion is improved while can-making and such a resin film can be applied to beverage cans requiring more excellent adhesion.

When the polypropylene film or the propylene ethylene based random copolymer film as mentioned above is laminated on the metal sheet, a thermal adhesion method is ordinarily employed. At this time, if a degree of crystallization of the resin film is more than 70%, the formability of the resin film is deteriorated and often causes breakage of film, and therefore preferably the degree of crystallization should be less than 70%, more preferably less than 60%.

As the resin film where the γs of the face to be an outside of can after can-making is 25 dyn/cm or higher, the resin film of polyester being a main component may be used. The resin film of polyester being a main component is defined by such a resin film containing polyester 50 mass % or more and further containing polyolefin and the like. For example, PET (polyethylene terephthalate) film having excellent formability is suited.

These resin films may be produced by melting a polymer resin under heating and shearing force through an extrusion machine, forming a wide and thin film through a T type die, instantly cooling by a chilled roll and coiling it, otherwise by an ordinary method of subjecting the resin film to biaxial orienting of longitudinal and lateral directions after passing through a T type die. Then, with respect to the resin film to be an inside of can after can-making, the treatment such as corona discharge for activating one surface is omitted.

If using the resin film of polyester being a main component to the face contacting stuffed food contents, and containing a wax component of 0.1 to 2.0% in the resin film to be an inside of can after can-making, it is possible not only to lower γs of the resin film, but also to improve lubricity of the film surface, so that the taking-out property of stuffed food contents is improved by leaps and bounds, provided that if the wax component is contained less than 0.1%, an effect thereby is small, and if exceeding 2.0%, the effect is saturated and the film fabrication is difficult.

The effect of the wax component cannot be provided by coating the wax component on the surface of the resin film. This is because the wax component pre-coated on the surface of the resin film is absorbed into the stuffed contents while retort-treatment which is conducted for sterilizing the contents after stuffing. If the wax component is contained in the resin film, as is the case of the present invention, the wax component is gradually thickened on the surface during the retort treatment, and therefore it is not all absorbed into the stuffed contents but the effect thereof can be usefully brought out.

As the wax component, both of an organic and an inorganic lubricants are available, and the organic lubricant such as fatty acid ester is desirable, and among them, more preferable is a carnauba wax [a main component is $CH_3(CH_2)_{24}COO(CH_2)_{29}CH_3$ and the other various components composed of aliphtic material and alcohol are contained] which is one of vegetable waxes and a natural wax, or stearic acid ester. These wax components are easily added to the resin film of polyester being a main component due to their molecular structure. The polyester film containing the wax component is produced by mixing the wax component of a predetermined amount with polyester and passing through an ordinary film forming method.

When aiming at an application of the present resin film to a can such as DTR can which receives a severe forming, it is preferable that the resin film of polyester being a main component is a biaxial oriented polyester film where a relaxation time T1 ρ of benzene ring carbon of 1, 4 coordination measured by a solid high resolution NMR is 150 msec or more. Because the biaxial oriented film is more excellent than a non-oriented film in characteristics such as tensile strength, tearing strength, impact strength, steam permeability, gas permeability and others. Herein, the relaxation time T1 ρ shows molecular maneuverability, and if the relaxation time T1 ρ is increased, the restraint force of non crystal parts in the resin film is increased. Thereby, crystallization of non crystal parts can be controlled while can-making. That is, the maneuverability of the non crystal parts is reduced and the re-orientating for crystallization is controlled. If the relaxation time T1 ρ is set to be 150 msec or more, the above mentioned excellent effects can be exhibited, and even if a severe forming is performed after lamination, the excellent formability and the impact resistance can be provided.

As a way for exceeding the relaxation time T1 ρ above 150 msec, a high temperature preheating method and a high temperature orienting method are combined in the longitudinal orienting procedure when the resin film is produced. Otherwise, this is enabled by rationalizing, for example, an intrinsic viscosity of resin, a catalyst, an amount of diethylene glycol, orienting conditions, heat treating conditions and the like. The preheating temperature of the longitudinal orienting when producing the resin film is preferably 90°C. or higher, more preferably 100°C or higher, and still more preferably 110°C. or higher. The orientating temperature is preferably 105°C. or higher, more preferably 110°C. or higher, and still more preferably 115°C. or higher.

Polyester as the main component of the resin film is polymer composed of dicarboxylic acid and glycol. As the dicarboxylic acid, applicable is terephthalic acid, isophthalic acid, naphthalene dicarboxylic acid, or diphenyldicarboxylic acid, and among them, terephthalic acid or isophthalic acid is preferable. As a glycol, there are enumerated ethylene glycol, propanediol and butanediol, and among them, ethylene glycol is preferable. More than two kinds of dicarboxylic acid or glycol may be used together. Further, polyester may be, if required, mixed with anti-oxidant, heat stabilizer, ultraviolet asborbent, plasticizer, pigment, antistatic agent, or crystal nucleus.

Polyester has excellent mechanical characteristics such as tensile strength, elastic modulus and impact strength, and has polarity, and therefore the formability and the adhesion of the resin film of polyester being a main component are improved up to the level durable to can-making and improve the impact resistance after can-making.

In the above mentioned resin film laminated metal sheet for can according to the invention, no limitation is especially defined to thickness of the resin film which will be an inside or outside of can after can-making. Ordinary thickness of around 10 to 50 μm is sufficient.

Further, as the metal sheet, applicable are aluminum sheets or soft steel sheets. In particular, optimum is a surface treated steel sheet (TFS) formed with double layered films comprising a lower layer of metallic chrome and an upper layer of chrome hydroxide. Also in this case, no limitation is especially made to amounts of the metallic chrome layer and the chrome hydroxide layer of TFS, but in view of the adhesion and the corrosion resistance after can-making, it is desirable that the metallic chrome layer is, in terms of chrome, 70 to 200 $mg/m^2$ and the chrome hydroxide is 10 to 30 $mg/m^2$.

With respect to the fabrication method thereof, when laminating the resin film composed of polypropylene film or propylene ethylene based random copolymer film of polypropylene being a main component on the surface of the metal sheet which will be an inside of can after can-making, the temperature of the metal sheet after passing laminating rolls (adhesion pressing rolls) should be above the melting point of the resin film. Thereby, when laminating, the resin film is substantially completely melted to increase fluidity, so that a wettability is improved to increase a contacting area with the metal surface, and the adhesion is improved. Since the crystal structure in the film is destroyed in company with melting of the film, crystal component obstructing the formability can be changed into non-crystal component, securing the formability of the resin film necessary for can-making.

Then, it is desirable that a time until cooling after passing the laminating rolls is 1 to 5 seconds. Being less than 1 second, since a wetting time is short, an enough contacting area cannot be secured, while exceeding 5 seconds, recrystallization of the film advances after passing the laminating rolls. In addition to these conditions, if the temperature of the metal sheet is set to be (the melting point of the resin film −30)° C., the wetting on the metal surface is made more secure, and the recrystallization is validly controlled, enabling the degree of crystallization to be less than 70%. This effect is made more effective by setting to be (the melting point of the resin film −10)° C., enabling the degree of crystallization to be less than 60%. An upper limit of the temperature is not especially defined, but it is desirable to be set at least less than (the melting point of the resin film +90)° C.

Also in case the resin film has a resin layer having a polar group in the face adhering the metal sheet, the lamination should be carried out under the same conditions as mentioned above.

On the other hand, when laminating the resin film of polyester being a main component on the metal surface, it is necessary that the temperature of the face of the resin film adhering the metal sheet is above the melting point of the resin film between 1 and 20 msec. Being less than 1 msec, it is not sufficient for the resin film to adhere the metal sheet, while exceeding 20 msec, the controlling performance of the molecular maneuverability in the vicinity of the face adhering the metal sheet is lost.

For getting the above effects, in addition to the lamination at a high speed, a cooling is also effective during adhering. No limitation is especially defined to pressing when laminating, but a surface pressure is preferably 1 to 30 kg/cm$^2$. If the surface pressure is too low, the sufficient adhesion is difficult to realize because a time is short though being above the melting point, while if the surface pressure is large, a force loading to the laminating rolls is large, necessitating strength in facility and inviting a large scale in facility.

A method of laminating the resin film on the metal surface is not limited to the above mentioned thermal adhesion method.

EXAMPLE 1

A steel sheet of 0.18 mm thickness and 977 mm width having passed through cold rolling, annealing and temper rolling was degreased and pickled, followed by chrome plating. The chrome plating was performed in a bath of $CrO_3$, $F^-$ and $SO_4^{2-}$, subjected to an intermediate rinse and thereafter to an electrolysis in a chemical conversion treatment solution containing $CrO_3$ and $F^-$. At that time, electrolyzing conditions (such as current density, amount of electricity) were changed to control amount of metallic chrome, amount of chrome hydroxide and γs.

The γs of the chrome plated steel sheet was evaluated by measuring a contact angle after a surface free energy-known liquid (pure water, glycerol, formamide, ethyleneglycol, dimethylglycol) was dropped on the steel surface at a humidity of 55 to 65 % and at a temperature of 20° C.

Figure 2:
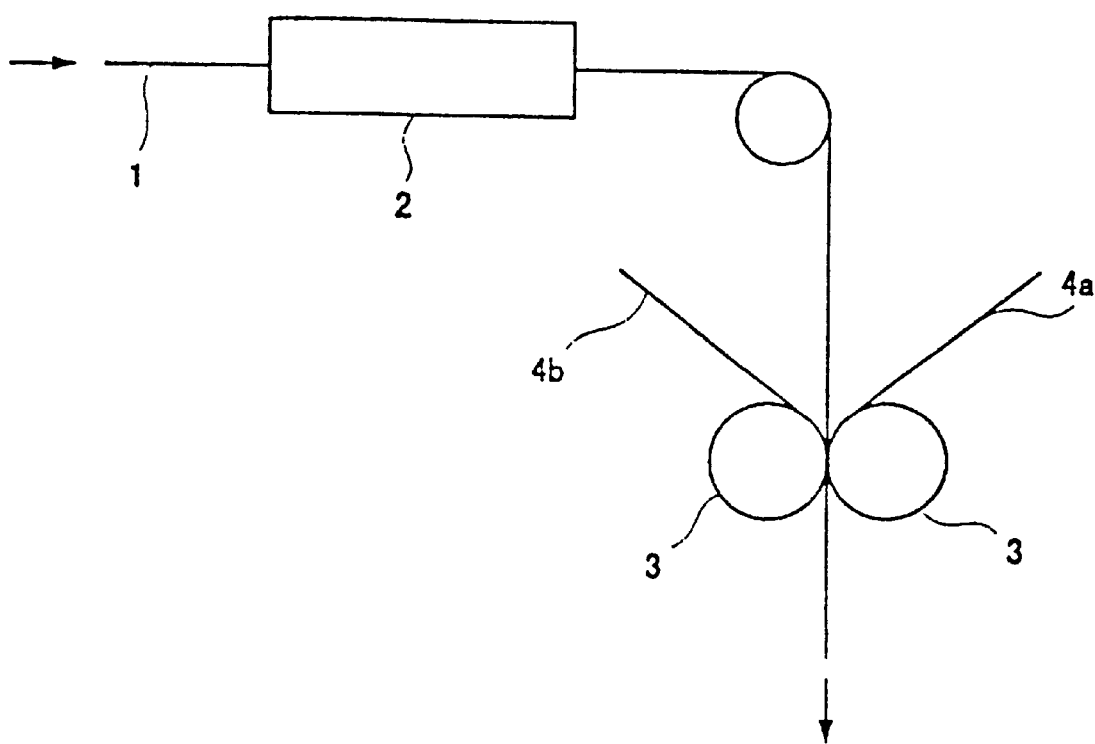
FIG. 2 is a view showing one example of resin film laminating apparatus for metal sheet.

The resin film laminating apparatus for metal sheet shown in FIG. 2 was used in which the above mentioned chrome plated steel sheets 1 were heated in the heating apparatus 2, and then laminated by the laminating rolls 3 with each kind of film 4a shown in Table 1 on the face to be an inside of can after can-making and with PET film 4b of γs being all 32 dyn/cm on the face to be an outside of can after can-making respectively through the thermal adhesion method.

Thus produced resin film laminated metal sheets were subjected to the measurement of γs by the above mentioned method, and to the evaluation of taking-out property of stuffed food contents 1), formability 2) and adhesion after forming 3) by the following methods.

1) Taking-out Property of Stuffed Food Contents

The resin film laminated metal sheets having 100 mm blank diameter were formed into cups at a drawing ratio (diameter before forming/diameter after forming) of 1.88 using a drawing machine. The contents of uniformly mixed eggs, meats oatmeals were stuffed in the cups, covered and followed by retort treatments (130° C.×90 minutes). Thereafter, the cups were turned over, manually shaked two or three times, and after the contents were taken out, degrees of the contents remained within the cups were observed, and the taking-out properties of stuffed food contents were evaluated as follows.

⊚: The taking-out is easy, and no stuck food remains in the inside of the cup.

X: The taking-out is hard by shaking by hands, and the stuck food can not be taken out without using a spoon or the like.

2) Formability

The resin film laminated metal sheet was coated with wax, punched into discs of 179 mm diameter, and formed into cups at a drawing ratio of 1.65. The cups were redrawn at a drawing ratio of 1.40. The observation of resin film of the above deep drawn cups was conducted, and the formability was evaluated as follows.

⊙: No injury exists in the film after forming, and no whiting is recognized therein.

⊚: The forming is possible, but the whiting is recognized.

X: The cup is broken at the barrel, and the forming is impossible.

3) Adhesion After Forming

From the barrel of the cup formed in the above 2), samples (15 mm width and 120 mm length) were cut out for peeling tests. The resin film was partially delaminated from the edge of the face of the cut-out sample, corresponding to the inside of the cup, and the delaminated film was peeled out by a tensile tester in an opposite direction (angle: 180°)to the chrome plated steel sheet at a tensile rate of 30 mm/min. Then the adhesion force was measured and the adhesion after forming was evaluated as follows.

⊙: 0.15 kg/15 mm or more

⊚: 0.10 kg/15 mm or more to less than 0.15 kg/15 mm

X: Less than 0.10 kg/15 mm

As shown in Table 1. The inventive examples are all excellent, while the comparative examples are inferior in the taking-out property of stuffed food contents.

TABLE 1

| | Chrome plated steel sheet | | | Film laminated steel sheet | | | Evaluation of performance | | |
|---|---|---|---|---|---|---|---|---|---|
| | Cr coating weight | | | Face corresponding to an inside after can-making | | | Taking-out | | |
| No. | Metallic chrome (mg/m²) | Cr oxide (mg/m²) | Surface free energy (dyn/cm) | Film types[1] | Film thickness (μ) | Surface free energy[3] (dyn/cm) | property of stuffed contents | Formability | Adhesion |
| E1 | 120 | 15 | 35 | PP | 30 | 18 | ○ | ⊚ | ⊚ |
| E2 | " | " | 35 | PP – PE Mixture | " | 19 | ○ | ⊚ | ⊚ |
| E3 | " | " | 35 | PP + Adhered layer[2] | 20 | 18 | ○ | ⊚ | ⊚ |
| E4 | " | " | 30 | PP | 15 | 18 | ○ | ⊚ | ⊚ |
| E5 | " | " | 35 | PE | 30 | 19 | ○ | ⊚ | ⊚ |
| E6 | " | " | 30 | PTFE | " | 12 | ○ | ○ | ○ |
| E7 | 120 | 10 | 20 | PP | " | 18 | ○ | ○ | ○ |
| C1 | 120 | 15 | 35 | PP + Corona discharge treatment (both sides) | " | 35 | x | ⊚ | ⊚ |
| C2 | " | " | 35 | PET | " | 32 | x | ⊚ | ⊚ |

Note
[1] PP: Polypropylene film
PE: Polyethylene film
PP – PE Mixture: Propylene ethylene based random copolymer film
PTFE: Polytetorafluoroethylene film (poly-4-ethylene fluoride film)
PET: Polyethylene terephthalate film
Note
[2] Adhered layer: Maleic acid anhydride graft modified polypropylene resin, Film thickness 5μ
Note
[3] Surface free energy is equivalent in both surfaces excepting the Inventive example 3, Side of adhered layer of the Inventive example 3 is 32 dyn/cm
E: Example
C: Comparative example

EXAMPLE 2

Figure 3:
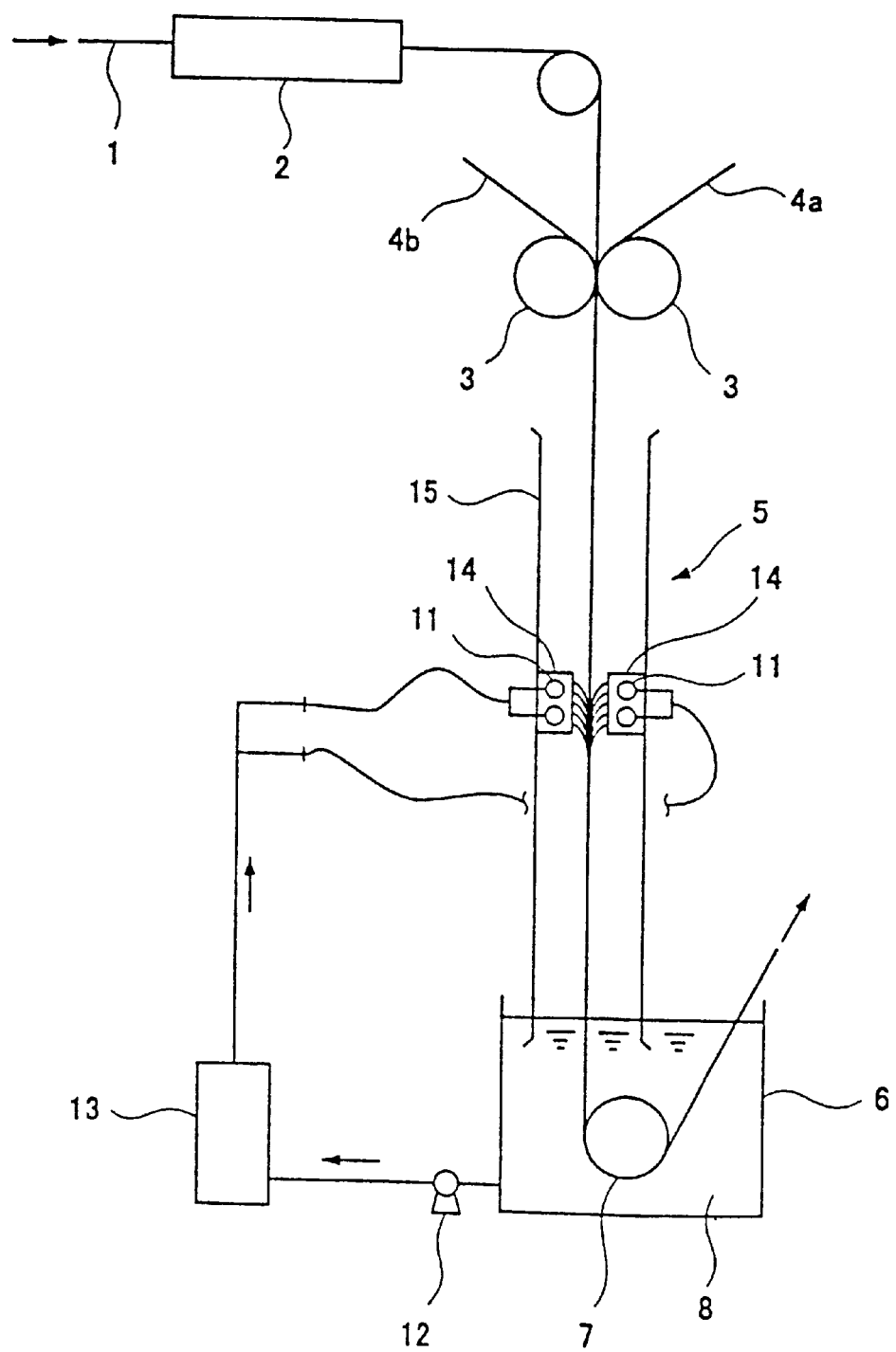
FIG. 3 is a view showing another example of resin film laminating apparatus for metal sheet.

The resin film laminating apparatus for metal sheet shown in FIG. 3 was used in which the same chrome plated steel sheets 1 as those of Example 1 were heated in the heating apparatus 2, laminated by the laminating rolls 3 with various kinds of film 4a shown in Table 2 on the face to be an inside of can after can-making and with PET film 4b on the face to be an outside of can after can-making respectively, sprayed with the cooled water 8 controlled to be at constant temperature by the heat exchanger 13 from the spraying apparatus 14 in the cooling apparatus 5 so as to cool the films, and then pulled upward via the sink roll 7 from the cooling water tank 6. At that time, the sheet temperature at the inlet of the laminating rolls 3, the temperature of the laminating rolls 3 and the position of the spray apparatus 14 were controlled so as to variously change the sheet temperature immediately after passing the laminating rolls 3, the time until starting of cooling after passing the laminating rolls 3, and the sheet temperature at starting of cooling as shown in Table 2.

With respect to the thus produced resin film laminated metal sheets, the taking-out property of stuffed food contents, the formability and the adhesion after forming were evaluated in the same ways as Example 1.

The melting point of the resin film was calculated from the endothermic peaks obtained by means of a differential scanning calorimeter (DSC-2 made by Perkin-Elmar Inc.) under the conditions where samples were heated to 300° C. at a nitrogen flowing amount of 20 ml/min and at a heating rate of 10° C./min.

The degree of crystallization of the resin film was measured as follows.

4) Degree of Crystallization of the Resin Film After Lamination

The density of the resin film adopted by melting the metal part of the resin film laminated metal sheet was obtained by a density gradient method, and the degree of crystallization of the resin film was calculated by the following equation.

$$X = [\{(1/dam)-(1/d)\}/\{(1/dam)-(1/dc)\}] \times 100$$

Herein,
X: Degree (%) of crystallization of the film
dam: Density (0.860 g/cc) of completely amorphous polypropylene resin
dc: Density (0.938 g/cc) of completely crystallized polypropylene resin
d: Density (g/cc) of the resin film after lamination The density gradient method was carried out by the density gradient pipe of JIS K 7112 as follows.

i) The density gradient pipe is made using a high density and a low density solutions.
ii) The relation between the depth of water of the density gradient pipe and the density is measured using a float having a known specific gravity.
iii) A sample is laid in the density gradient pipe, and after 2 hr a position where the sample stands still (the depth of water) is read out.
iv) The density of the sample is calculated from the relation between the depth of water of the density gradient pipe and the density.

As shown in Table 2, the inventive examples show that the degrees of crystallization of the resin film are all less than 70%, and each of the properties is excellent. In particular, when the temperature of the metal sheet was above (the melting point of the resin film −10)° C. at starting of cooling, the degree of crystallization of the film is less than 60° C., and more excellent formability and adhesion may be obtained.

On the other hand, the degrees of crystallization of the films of the comparative examples 1, 3, 4 are 70% or more, and the formability and the adhesion are inferior. In the comparative example 2 where PET was used to the face to be an inside of can after can-making, the taking-out property is poor.

TABLE 2

| | Chrome plated steel sheet Cr coating weight | | Laminated film Face corresponding to an inside after can-making | | | Laminating conditions | | | | Evaluation of performance | | |
|---|---|---|---|---|---|---|---|---|---|---|---|---|
| | | | | | | Sheet T. immediately after passing the laminating rolls (° C.) | Time until start of cooling after the passing laminating rolls (sec) | Sheet T. at starting of cooling (° C.) | Degree of crystallization of film after lamination of cooling (%) | Taking-out property of stuffed contents | | |
| No. | Metallic chrome (mg/m²) | Cr oxide (mg/m²) | Film types 1), 2) | Film thickness (μm) | Melting point of film (° C.) | | | | | | Formability | Adhesion |
| E1 | 120 | 15 | PP + Adhered layer | 20 | 165 | 180 | 2 | 170 | 52 | ○ | ◎ | ◎ |
| E2 | 120 | 15 | PP + Adhered layer | 20 | 165 | 175 | 1 | 170 | 54 | ○ | ◎ | ◎ |
| E3 | 120 | 15 | PP + Adhered layer | 20 | 165 | 182 | 3 | 177 | 52 | ○ | ◎ | ◎ |
| E4 | 120 | 15 | PP + Adhered layer | 20 | 165 | 165 | 4 | 145 | 65 | ○ | ○ | ◎ |
| E5 | 120 | 15 | PP + Adhered layer | 20 | 165 | 182 | 5 | 162 | 58 | ○ | ◎ | ◎ |
| E6 | 120 | 15 | PP + Adhered layer | 30 | 145 | 160 | 3 | 145 | 58 | ○ | ◎ | ◎ |
| E7 | 120 | 15 | PP + Adhered layer | 30 | 145 | 145 | 3 | 130 | 63 | ○ | ○ | ◎ |
| E8 | 120 | 15 | PP – PE Mixture | 30 | 165 | 180 | 3 | 165 | 52 | ○ | ◎ | ◎ |
| E9 | 120 | 15 | PP | 20 | 165 | 180 | 3 | 165 | 52 | ○ | ◎ | ◎ |
| E10 | 120 | 15 | PP + Adhered layer | 20 | 165 | 180 | 1 | 177 | 50 | ○ | ◎ | ○ |
| E11 | 120 | 15 | PP + Adhered layer | 20 | 165 | 180 | 6 | 150 | 63 | ○ | ○ | ○ |
| E12 | 120 | 15 | PP + Adhered layer | 20 | 165 | 165 | 7 | 130 | 68 | ○ | ○ | ○ |
| C1 | 120 | 15 | PE | 30 | 120 | 120 | 2 | 110 | 40 | ○ | x | x |
| C2 | 120 | 15 | PET | 20 | 220 | 180 | 2 | 170 | 20 | x | ◎ | ◎ |
| C3 | 120 | 15 | PP + Adhered layer | 20 | 165 | 155 | 2 | 145 | 78 | ○ | x | x |
| C4 | 120 | 15 | PP + Adhered layer | 20 | 165 | 150 | 1 | 145 | 74 | ○ | x | x |

Note
1) PP: Polypropylene film
PP + PE Mixture: Propylene ethylene based random copolymer film
PE: Polyethylene film
PET: Polyethylene terephthalate film
Note
2) Adhered layer: Maleic acid anhydride graft modified polypropylene resin, Film thickness 5 μm
E: Example
C: Comparative example
T.: Temperature Example 3

The resin film laminating apparatus for metal sheet shown in FIG. 2 was used in which the chrome plated steel sheets of the chrome amount being 120 mg/m² and the chrome hydroxide amount being 15 mg/m2 fabricated in the same method in Example 1 were heated in the metal sheet heating apparatus 2, and the laminating rolls 3 laminated the film 4a on the face of the steel sheets to be an inside of can after can-making and laminated the resin film 4b on the face of them to be an outside of can after can-making. At that time, as the resin film 4a on the inside of can after can-making, the resin film 4b on the outside of can after can-making which was added with wax was used. Table 3 shows the laminated resin films and the laminating temperature conditions. The laminating rolls 3 were internal cooling rolls, and the cooling water was forcibly circulated during laminating so as to carry out the cooling while adhering the film.

With respect to the thus produced resin film laminated metal sheets, the formability and the adhesion after forming were evaluated in the same ways as Example 1. The taking-out properties of stuffed food contents were evaluated in the following 3 steps more in detail than Example 1.

⊙: The taking-out is easy, and no stuck food remains in the inside of the cup.
○: The taking-out is hard only by shaking by hands, but stuck food can be taken out by a spoon or the like, and little food stuck to the inside of the cup are left.
X: The taking-out is hard only by shaking by hands, and stuck food can be taken out by a spoon or the like. Much food is left in the inside of the cup after taking out.

Further, the relaxation time T1 ρ, the melting point of polyester and the impact resistance were measured as follows.

5) Relaxation Time T1 ρ of Polyester

For measuring solid NMR, used were a spectrometer JNM-GX270 made by Japan Electron Optics Laboratory Co., Ltd., a solid amplifier made by the same, MAS controller NM-GSH27MU, and a probe NM-GSH27T made by the same. The measurement of T1 ρ (vertical relaxation in the rotational coordinate) of $^{13}C$ nucleus was practiced. The measuring conditions were temperature of 24.5° C., humidity of 50% RH, static magnetic field of 6.34 T (Tesla), and resonant frequencies of $^1H$, $^{13}C$ being 270.2 MHz and 67.9 MHz respectively. MAS (rotation of magic angle) method was employed for canceling influences of anisotropy of chemical shift. The rotation number was 3.5 to 3.7 kHz. The conditions of pulse series were 90 for $^1H$, pulse width of 4 μsec, the strength of rocking magnetic field of 62.5 kHz. The contacting time of CP (cross polarization) for shifting the polarization of $^1H$ to $^{13}C$ was 1.5 msec. As the holding times τ, 0.001, 0.5, 0.7, 1.3, 7, 10, 20, 30, 40, 50 msec were used. Free induction decrement (FID) of $^{13}C$ magnetization vector after the holding time τ was measured (a high output coupling was done for removing influences of dipole mutual action by $^1H$ during measuring FID. For improving S/N, integrations were made 512 times.). The pulse repeating time was between 5 and 15 sec.

T1 ρ values can be ordinarily described by the following equation and can be obtained from the slope when the peak strength measured for each of the holding times is plotted in a scale of semi-logarithm.

$$I(t)=\Sigma(Ai) \exp(-t/T1 \rho i)$$

Ai: Percentage of components with respect to T1 ρ i

Herein, analyses were made by the 2 components (T1 ρ 1: Non-crystal component, T1 ρ 2: Crystal component), and the following equation was used so as to obtain the value by a least square method.

$$I(t)=fa1 \cdot \exp(-t/T1 \rho 1) + fa2 \cdot \exp(-t/T1 \rho 2)$$

fa1: Percentage of components with respect to T1 ρ 1 fa2: Percentage of components with respect to T1 ρ 2

$$fa1+fa2=1$$

herein, T1 ρ 2 is used for T1 ρ 1.

current after 3 seconds, and the impact resistances were evaluated as follows.

⊙: Less than 0.01 mA

○: 0.01 mA or more to less than 0.1 mA

X: 0.1 mA or more

As shown in Table 3, the inventive examples are all excellent in the taking-out property of stuffed food contents, the formability, the adhesion, and the impact resistance. In particular, in the inventive examples where the relaxation time T1 ρ is 150 msec or more, or the time when the temperature of the resin film contacting the metal sheet goes above the melting point of the resin film, is 1 to 20 msec, the formability, the adhesion and the impact resistance are more excellent. On the other hand, the comparative examples 1 to 3 are poor in the taking-out property of food stuffed contents, and the comparative examples 4 and 5 are inferior in the formability.

TABLE 3

| Classification | Film | Wax[6] Types | Addition amount (wt %) | Melting point (° C.) | Film thickness (μm) | T1ρ (msec) | Sheet T. at starting of lamination (° C.) | Time at above melting point (msec) | Taking-out property of stuffed contents | Formability | Adhesion | Impact resistance |
|---|---|---|---|---|---|---|---|---|---|---|---|---|
| E1 | PET[1] | Carnauba | 0.50 | 255 | 15 | 220 | 282 | 15 | ⊙ | ⊙ | ⊙ | ⊙ |
| E2 | PET | Carnauba | 0.75 | 255 | 15 | 220 | 282 | 15 | ⊙ | ⊙ | ⊙ | ⊙ |
| E3 | PET | Carnauba | 0.10 | 255 | 15 | 220 | 282 | 15 | ○ | ⊙ | ⊙ | ⊙ |
| E4 | PET | Carnauba | 1.50 | 255 | 15 | 220 | 282 | 15 | ⊙ | ⊙ | ⊙ | ⊙ |
| E5 | PET | Stearylstearey[2] | 0.50 | 255 | 15 | 220 | 282 | 15 | ⊙ | ⊙ | ⊙ | ⊙ |
| E6 | PET | Stearylstearey | 0.75 | 255 | 15 | 220 | 282 | 15 | ⊙ | ⊙ | ⊙ | ⊙ |
| E7 | PET | Silicone | 1.50 | 255 | 15 | 220 | 282 | 15 | ○ | ⊙ | ⊙ | ⊙ |
| E8 | PET | Carnauba | 0.50 | 255 | 15 | 400 | 282 | 15 | ⊙ | ⊙ | ⊙ | ⊙ |
| E9 | PET | Carnauba | 0.50 | 255 | 15 | 160 | 282 | 15 | ⊙ | ⊙ | ⊙ | ⊙ |
| E10 | PET | Carnauba | 0.50 | 255 | 15 | 120 | 282 | 15 | ⊙ | ○ | ○ | ○ |
| E11 | PET | Carnauba | 0.50 | 255 | 15 | 220 | 260 | 3 | ⊙ | ⊙ | ○ | ⊙ |
| E12 | PET | Carnauba | 0.50 | 255 | 15 | 220 | 255 | 0.5 | ⊙ | ○ | ○ | ○ |
| E13 | PET | Carnauba | 0.50 | 255 | 15 | 220 | 293 | 25 | ⊙ | ○ | ○ | ○ |
| E14 | PET/I[3] | Carnauba | 0.50 | 226 | 15 | 210 | 282 | 20 | ⊙ | ⊙ | ⊙ | ⊙ |
| E15 | PET | Carnauba | 0.50 | 255 | 25 | 220 | 282 | 15 | ⊙ | ⊙ | ⊙ | ⊙ |
| E16 | PET | Carnauba | 0.50 | 255 | 12 | 220 | 282 | 15 | ⊙ | ⊙ | ⊙ | ⊙ |
| C1 | PET | — | — | 255 | 15 | 220 | 282 | 15 | x | ⊙ | ⊙ | ⊙ |
| C2 | PET | Carnauba | 0.05 | 255 | 15 | 220 | 282 | 15 | x | ⊙ | ⊙ | ⊙ |
| C3 | PET | Stearylstearey | 0.05 | 255 | 15 | 220 | 282 | 15 | x | ⊙ | ⊙ | ⊙ |
| C4 | PP[4] | — | — | 160 | 20 | — | 190 | 17 | ⊙ | x | — | — |
| C5 | PE[5] | — | — | 110 | 50 | — | 140 | 19 | ⊙ | x | — | — |

[1] PET: Polyethylene terephthalate (Biaxial orientated film)
[2] Stearylstearey: Stearic acid ester (C18—C18)
[3] PET/I: Isophthalic acid copolymer polyethylene terephthalate (Ratio of copolymerization of isophthalaic acid:12 mol %, Biaxial oriented film)
[4] PP: Polypropylene (Biaxial oriented film)
[5] PE: Polyethylene
[6] Wax is added to only a resin film to be an inside of can
E: Example
C: Comparative example
T.: Temperature 6) Melting Point of Polyester After crystallizing polyester, the melting point was measured at a heating rate of 10° C./min by the same differential scanning calorimeter as described above.

7) Impact Resistance

With respect to the cups formed in the above 2) for the evaluation of the formability, those were filled with water, 10 cups per each of tests were dropped on a vinyl chloride floor from a height of 1.25 m, then the voltage of 6 V was supplied to the electrodes and the cups for reading the

What is claimed is:

1. A resin film laminated metal sheet for a can, said metal sheet having a first face for the interior of the can and a second face for the exterior of the can; a first resin film layer being laminated to the first face of the metal sheet and a second resin film layer being laminated to the second face of the metal sheet, said first resin laminated layer having a degree of crystallization of 50 to 70%, said and a first resin layer first face with a surface free energy γs of 10 dyn/cm or more to less than 30 dyn/cm, said first face forming an inside of the can after can-making, for contact with stuffed food contents.

2. The resin film laminated metal sheet for a can according to claim 1, wherein the second resin film has a second resin film first face with a surface free energy γs of 25 dyn/cm or more, said face forming an outside of the can after can-making, for contact with atmospheric air.

3. The resin film laminated metal sheet for a can according to claim 1, wherein the first resin film has a first resin film second face which is adhered to the metal sheet and has a surface free energy γs which is smaller than the γs of said metal sheet.

4. The resin film laminated metal sheet for a can according to claim 2, wherein the second resin film has a second resin film second face which is adhered to the metal sheet and has a surface free energy γs which is smaller than the γs of said metal sheet.

5. The resin film laminated metal sheet for a can according to claim 1, wherein the first resin film second face contains a polar group.

6. The resin film laminated metal sheet according to claim 5, wherein the first resin film second face containing the polar group comprises polypropylene modified with maleic acid anhydride or propylene ethylene based random copolymer modified with maleic acid anhydride.

7. The resin film laminated metal sheet, according to claim 1, wherein a degree of crystallization of the first laminated resin film is 50% to less than 60%.

8. The resin film laminated metal sheet according to claim wherein a degree of crystallization of the first laminated resin film is 50% to less than 60%.

9. The resin film laminated metal sheet according to claim 6, wherein a degree of crystallization of the first laminated resin film is 50% to less than 60%.

10. The resin film laminated metal sheet according to claim 1, wherein a main component of the second resin film is polyester.

11. The resin film laminated metal sheet according to claim 5, wherein a main component of the second resin film is polyester.

12. A resin film laminated metal sheet for a can, said metal sheet having a first face for the interior of the can and a second face for the exterior of the can; a first resin film layer being laminated to the first face of the metal and a second resin film layer being laminated to the second face of the metal, said first resin laminated layer having a main component of polyester, and containing a wax in an amount of 0.1 to 2.0% by weight and with a 150 msec or more of relaxation time T1 ρ of benzene ring carbon of 1,4 coordination measured by high resolution of NMR.

13. The resin film laminated metal sheet according to claim 12, wherein the wax is carnauba wax or stearic acid ester.

14. A metal can for food made with the metal sheet of claim 1 with the metal sheet first face forming an inner wall of the can.

15. A metal can for food made with the metal sheet of claim 12 with the first resin film layer containing the wax forming an inner wall of the can.

* * * * *